United States Patent [19]
Osborne et al.

[11] 3,791,508
[45] Feb. 12, 1974

[54] WORM CONVEYORS

[75] Inventors: Michael Bryon Osborne; Allan James Birch, both of Hull, England

[73] Assignee: Kingston Conveyors Limited, Hull, England

[22] Filed: Nov. 20, 1972

[21] Appl. No.: 307,992

[52] U.S. Cl. .............................. 198/34 A, 198/213
[51] Int. Cl. ............................................. B65g 47/26
[58] Field of Search ......... 198/131, 34 A, 213, 22 B

[56] References Cited
UNITED STATES PATENTS
3,054,496   9/1962   Carter .............................. 198/34 A Primary Examiner—Richard E. Aegerter
Attorney, Agent, or Firm—William A. Drucker

[57] ABSTRACT

A conveyor for moving articles along on a rail or other smooth surface comprising two superposed worms with a third worm with its axis symmetrically spaced from the axes of the other two worms, the worms being formed as helical grooves with like root diameters in rubber or plastics material on metal shafts which in use are driven at the same speed.

2 Claims, 3 Drawing Figures

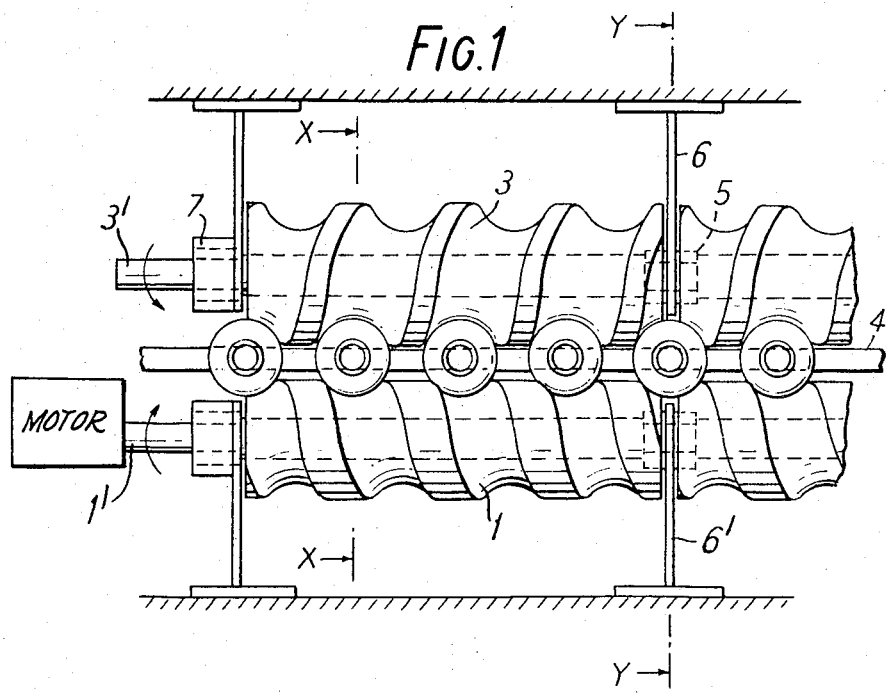
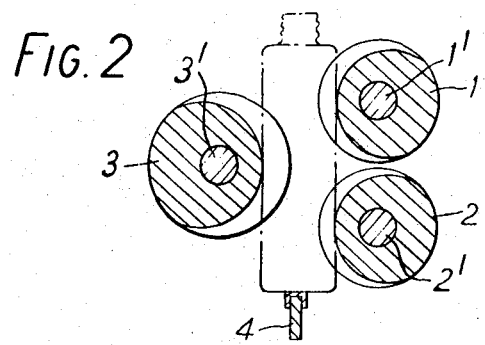
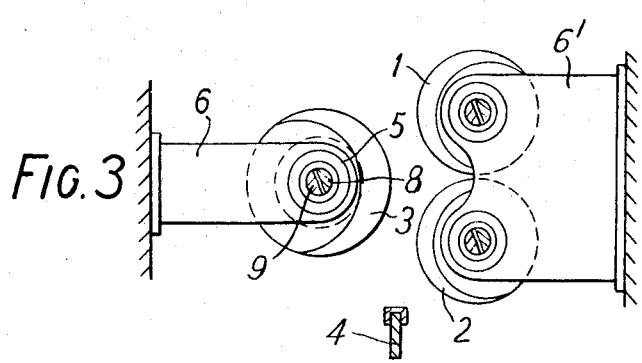

WORM CONVEYORS

BACKGROUND TO THE INVENTION

Conveyors comprising single and twin rotary helical groove worms operating in conjunction with stationary linear movement guides are known and such worms are commonly made of rubber or plastics material on metallic shafts. Such conveyors, which are used for moving bottles, cans and like elongated articles usually circular section containers, do not give precise location of the conveyed articles and are not entirely suitable for high speed operation particularly when there is intermittent indexing with high forces on acceleration and deceleration.

The object of the invention is to provide a novel construction of rotary worm conveyor which gives maximum stability to the conveyor and so positively locates the conveyed articles that they are moved in accurate positional relation without jostling or danger of falling over.

A further object of the invention is to provide such novel conveyor without the disadvantage in a long conveyor of having to use worms with long shafts and large bearings.

Thus, according to the invention there is provided a worm conveyor comprising two superposed worms and a third worm with its axis symmetrically spaced from the axes of the other two worms so providing three point location of the conveyed articles which are supported on a rail or other smooth surface which may be stationary or moving in the conveying direction; the three worms having the same root diameter and all being driven at the same rotational speed.

Each of such worms may be made in sections with the ends of adjacent co-axial shafts supported by intermediate bearings located in the ends of such sections and carried by brackets with the shaft end of one section drivingly engaging the end of the shaft of the adjacent co-axial section. Such driving engagement may be provided by making the shaft ends semi-circular with their flat faces abutting.

DESCRIPTION OF DRAWINGS

FIG. 1 is a plan view looking down on an end of the worm conveyor which is shown conveying tubular containers, FIG. 2 is a section on the line X—X of FIG. 1 showing the disposition of the three worms, and FIG. 3 is a section on the line Y—Y showing intermediate bearing brackets, bearings, and the shafts end joints.

DESCRIPTION OF PREFERRED EMBODIMENT OF THE INVENTION

The sections between bearing brackets must all be the same length but adjacent sections of the three worms may be smaller, the same length or longer as may be desired according to the machine requirements or the design of the worms supporting frame.

Referring to said drawings and in particular to FIGS. 1 and 2, the conveyor comprises three worms 1, 2 and 3 rotatable about parallel axes. The worms 1 and 2 are superposed and the third worm 3 is laterally disposed with its axis symmetrically spaced from those of the worms 3 and 2 as may be seen in FIG. 2 so providing three point location for the conveyed containers (shown in chain lines) which are supported on a rail 4 or like smooth surface. The worms 1, 2 and 3 have a like root diameter and are driven at the same speed, and the worm 3 may have a large tip diameter substantially as illustrated.

The worms in the known manner are conveniently helical grooves moulded in rubber or plastics material supported on metal shafts $1^1$, $2^1$ and $3^1$ respectively, and in the preferred arrangement as illustrated the worms 1, 2 and 3 are made in sections with the ends of their shafts supported by intermediate bearings 5, located in the rubber or plastics material at the ends of the sections and carried by brackets 6, $6^1$ extending from the machine frame (see also FIG. 3), and by end bearings 7 carried by similar brackets. The shafts $1^1$, $2^1$ and $3^1$ of adjacent co-axial worm sections are interconnected for simultaneous rotation as by reducing their ends to semi-circular shape as at 8, 9 (FIG. 3) and abutting the flat faces so formed.

We claim:

1. In combination with a conveyor for linearly moving articles along a smooth support surface, a first helical groove worm with its rotational axis spaced from and parallel to said support surface, a second helical groove worm with its rotational axis vertically spaced from and parallel to said rotational axis of said first worm, and a third helical groove worm with its rotational axis symmetrically spaced from said axes of said first and second worms, the helical grooves of said worms having like root diameters and means for driving said worms at like speed.

2. The combination as claimed in claim 1, wherein each worm includes helical groove formed from plastic and a metal shaft and where each worm is made in axially aligned sections; means for drivingly engaging said metal shaft of one of said sections with the metal shaft of the adjacent aligned section, a bearing located in said plastic of said adjacent sections for supporting said shafts; and bracket means for holding said bearing.

* * * * *